United States Patent Office 3,451,313
Patented June 24, 1969

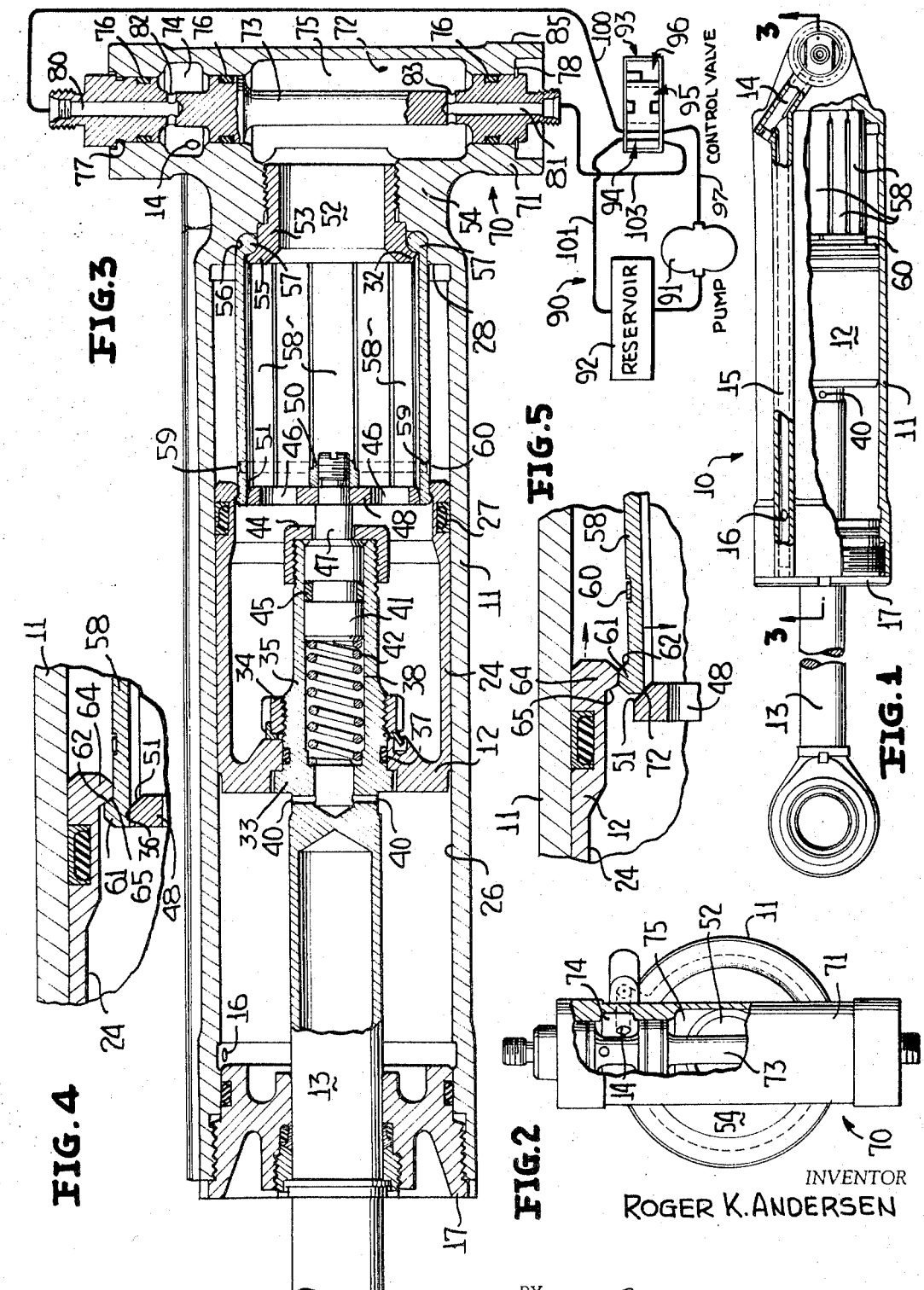

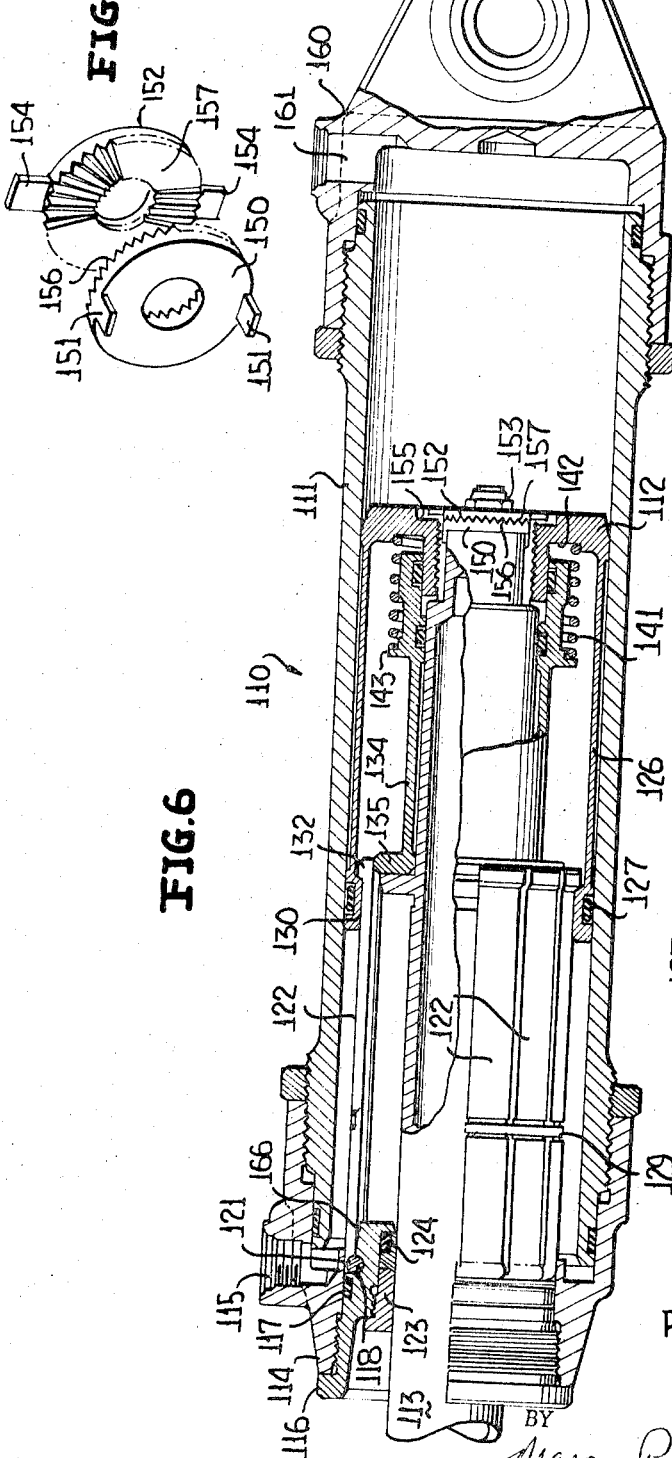

3,451,313
MIDSTROKE LOCKING ACTUATOR
Roger K. Andersen, Los Angeles, Calif., assignor to Parker-Hannifin Corporation, Cleveland, Ohio, a corporation of Ohio
Filed June 21, 1967, Ser. No. 647,808
Int. Cl. F15b 15/26
U.S. Cl. 91—45                                   31 Claims

ABSTRACT OF THE DISCLOSURE

A fluid pressure operated actuator of the piston-cylinder type including a mechanism for locking the piston from movement in one direction intermediate its limits of movement. The locking mechanism includes a generally cylindrical array of locking fingers in telescopic relation with a piston skirt. The fingers and skirt are provided with interengageable latching portions. A piston carried locking mechanism is engageable with the latching fingers to move them into latching engagement with the skirt.

One embodiment locks the piston against movement in the piston rod extending direction and another locks the piston against movement in the piston rod retracting direction.

The actuator includes a fluid header for directing fluid to and from ports formed in opposing ends of the actuator cylinder. The header includes an outer member having a bore therethrough and an inner member inserted in this bore. The outer and inner members cooperate to form fluid chambers which are in fluid communication with the actuator cylinder ports. The outer member of the fluid header has bearing surfaces formed thereon for bearing support of the actuator.

---

The present invention is an improvement over the device shown in my prior Patent 3,177,780, which discloses a locking cylinder in which a piston may be locked at either end of its stroke, in that it provides a cylinder in which the piston may be locked against movement in one direction at a point intermediate its stroke.

Locking at a mid stroke position is accomplished without utilizing friction grips, bendable fingers, and other previously known devices that result in scoring of the cylinder bore, brinelling of the locking elements, and failure from fatigue. This result is achieved by pivotally anchoring locking fingers to the cylinder in a manner to permit deflection of their free ends without bending providing cooperable latching means on the fingers and piston, and providing a fluid pressure operated locking plunger carried by the piston that engages and disengages the locking fingers to lock or release the cooperable latching means.

FIGURE 1 is a longitudinal view, partially in section and partially in elevation, showing one form of the invention in which the piston may be locked at a mid position against continued rod extension movement.

FIGURE 2 is an enlarged end view of the embodiment of FIGURE 1 rotated 90° with respect to FIGURE 1, having parts broken away, and showing a cylinder mounted header with inner and outer members cooperating to form fluid chambers therein.

FIGURE 3 is an enlarged longitudinal cross sectional view taken on the line 3—3 of FIGURE 1.

FIGURE 4 is an enlarged fragmentary longitudinal sectional view showing the latching fingers in latch position.

FIGURE 5 is an enlarged fragmentary longitudinal sectional showing the latching fingers in unlatch position.

FIGURE 6 is a longitudinal sectional view, parts being in elevation, and showing a further arrangement of the invention with latching fingers mounted within the cylinder at the end thereof through which the piston rod extends.

FIGURE 7 is an enlarged longitudinal sectional view of portions of the piston latching apparatus shown in FIGURE 6 and showing the parts in latching position.

FIGURE 8 is an enlarged perspective view showing cooperating lock washers utilized in attaching the piston to the piston rod in the FIGURE 6 form.

DESCRIPTION OF FIGURE 1 FORM

Actuator 10 includes a cylinder 11 having a piston assembly therein comprising a piston 12 with a piston rod 13 attached thereto. The cylinder has a longitudinal passage 15 that connects at one end with a passage 14 and at the other end with a passage 16 that leads into the interior of the cylinder. One end of the cylinder is closed by an end cap assembly 17 through which piston rod 13 extends.

Piston 12 includes a skirt 24 sealed relative to cylinder bore 26 by a packing assembly 27 and it is attached to rod 13 by a nut 34 threaded onto rod extension 35. Nut 34 clamps piston 12 against a flange 33 on the piston rod. A packing 37 seals the rod relative to the piston.

Rod extension 35 has a bore 38 communicating with cylinder bore 26 on the left side of piston 12 by way of radial passages 40. Bore 38 contains a locking plunger 41 sealed by packing 45 and pressed by spring 42 toward retainer nut 44. Plunger 41 has an extension 47 upon which is clamped a lock plate 48 by threaded nut 50. Locking plate 48 has a circular bevelled cam surface 51 and also has several perforations 46 therethrough.

Threaded into end wall 54 of cylinder 11 is a retainer 53 having a port 52 and a flange 55 whose one side is on a radius to closely fit end portions 57 of a circular array of latching fingers 58. End portions 57 are of part circular cross section and are seated against a correspondingly radiused shoulder 56 in end wall 54 and act as a pivot to permit slight rocking movement of fingers 58 in the manner disclosed in previously mentioned Patent 3,177,780. Each finger 58 has a groove 59 and a split spring ring 60 is within these grooves to encompass the latching fingers 58 to bias their free ends adjacent lock plate 48 radially inwardly. The free end of each latching finger 58 has an external bead 61 for latching engagement with an internal bead 64 on piston skirt 24. The opposite sides of each bead are bevelled to facilitate passing of bead 64 over bead 61 when fingers 58 are in unlatch position.

Cylinder end wall 54 provides a fluid header 70 that includes an outer member 71 having a bore 72 containing a core member 73 that closes bore 72 at three spaced locations to form chambers 74 and 75 that are sealed by packings 76. Core member 73 is retained within bore 72 by shoulder 77 and snap rings 78. Ports 80 and 81 in core member 73 respectively connect chambers 74, 75 with fluid conduits 100, 103 via radial ports 82, 83. Passage 14 connects chamber 74 with cylinder bore 26 on the left side of piston 12 by way of passages 15 and 16 and chamber 75 is connected to cylinder bore 26 on the right side of piston 12 by way of port 52.

Outer member 71 has a pair of spaced cylindrical bearing surfaces 84, 85 for pivotally supporting actuator 10 in a suitable bracket, not shown.

A fluid supply means 90 may be connected to actuator 10 and includes a pump 91, a reservoir 92, a control valve 93. Control valve 93 has three positions, indicated by the numerals 94, 95 and 96, with flow passages through the valve at each position being as diagrammatically illustrated. In position 94 valve 93 connects pump discharge line 97 with line 100 and port 80 and connects reservoir line 101 with line 103 and port 81. In valve position 95 these connections are reversed. In valve position 96 pump discharge line 97 is blocked and lines 100 and 103 are both connected to reservoir line 101.

OPERATION OF FIGURE 1 FORM

In its fully retracted position, the right hand of piston 12 is bottomed against shoulder 28 of end wall 54. To fully extend piston rod 13, valve 93, having positions 94, 95 and 96 diagrammatically illustrated and separated by the broken lines therebetween in FIGURE 3, is moved to position 95 so that pressure fluid will be delivered to port 81 and the right side of piston 12 while fluid on the left side of piston 12 is exhausted through port 16 and thus cause piston 12 to move to the left. At the same time, pressure fluid on the right side of piston 12 acts on lock plunger 41 to move the same to the left within bore 38 against the action of spring 42 until locking plate 48 contacts retainer nut 44. This movement of plunger 41 and lock plate 48 withdraws the latter from its position within the free ends of latch fingers 58 to permit spring 60 to deflect such free ends radially inwardly. Such deflection is accomplished by a rocking of the fingers at portions 57 without bending of the fingers. Inward deflection of the free ends of the fingers is limited to the approximate position shown in FIGURE 5 with the corner 72 of the free ends being in register with bevelled cam surface 51 on lock plate 48. Such radial deflection of the fingers may be limited either by contact of the fingers with tapered surface 32 on retainer 53 or by circumferential contact of the free ends of the fingers with each other.

Upon continued application of fluid pressure to the right side of piston 12, bead 64 on piston 12 will pass over bead 61 on fingers 58 and piston 12 will move to its stop position against end cap 17 with rod 13 fully extended.

To retract rod 13, valve 93 is moved to position 94 to admit pressure fluid to the left side of piston 12 and the exhaust of fluid from the right side. This permits spring 42, aided by pressure fluid from the left side of piston 12 that gains access to bore 38 via ports 40, to move lock plunger 41 and lock plate 48 rightwardly relative to piston 12 until plunger 41 is stopped by retainer 44. This also causes piston 12 to move to the right toward retracted position. As piston 12 approaches fingers 58, finger corner 72 will engage lock plate bevel 51, as shown in FIGURE 5. At this time bead 61 is radially opposite bead 64 and the free ends of fingers 58 cannot be cammed radially outwardly by bevel 51. Piston 12 continues to move to the right and movement of lock plate 48 and plunger 41 is momentarily halted by contact of bevel 51 with corner 72 until piston bead 64 has passed beyond finger bead 61. During the time that lock plate 48 and plunger 41 are halted, spring 42 collapses somewhat and plunger 41 has moved away from retainer 44. As soon as bead 64 has passed over bead 61, spring 42 moves plunger 41 and lock plate 48 toward retainer 44 to cause bevel 51 to cam the free ends of fingers 58 outwardly and lock plate 48 passes within the spring fingers, as indicated in FIGURE 4, to hold them in expanded position. Piston 12 continues to move to the right until it is in fully retracted position.

When it is desired to extend rod 13 only part way and to lock it in the partly extended position to prevent further extension by external force, valve 93 is moved to position 95 to pressurize the right side of piston 12 and move it to the left. At the same time, lock plunger 47 and lock plate 48 move to the left in bore 38 to permit spring 60 to deflect the free ends of fingers 58 radially inward, as previously described.

As piston bead 64 approaches finger beads 61, valve 93 is moved to position 96. This cuts off the supply of pressure fluid to the cylinder and connects both sides of piston 12 to each other and to the reservoir 92. Because the fluid pressure on both sides of piston 12 is now substantially equal, spring 42 returns lock plunger 47 and lock plate 48 rightwardly and bevel 51 contacts finger corners 72 to expand the free ends of the fingers to place bead 61 in the path of piston bead 64, as shown in FIGURE 4. Contact of the adjacent shoulders 62, 65 of the two beads prevents further leftward movement of piston 12 and the cylindrical portion 36 of lock plate 48 prevents radially inward deflection of fingers 58 that would otherwise permit bead 64 to override bead 61.

DESCRIPTION OF FIGURE 6 FORM

FIGURES 6–8 illustrate an actuator that may be locked against rod retraction at a point intermediate the limits of the piston stroke. In this form, actuator 110 includes a cylinder 111 having a piston 112 attached to a piston rod 113 by means of a threaded connection 147 and locked thereon by means of washers 150 and 152. Washer 150 is nonrotatably keyed to rod 113 by tabs 151 that extend into a pair of axial slots 146 in rod 113 and has radial serrations 156 engaged with serrations 157 on washer 152. The latter is nonrotatably keyed to piston 112 by tabs 154 extending into a pair of radial slots 155 in piston 112. Washers 150, 152 are held in place by nut 153 threaded onto rod 113.

Cylinder 111 has an end cap 114 threaded to one end and which has a port 115 leading to the cylinder interior on the left side of piston 112. A retainer 116 is threaded into cap 114 and sealed by packing 117. Retainer 116 has annular groove 118 of part circular cross section in which end portions 121 of a circular array of latching fingers 122 are mounted. A bushing 123 threaded into retainer 116 has an opening through which piston rod 113 passes and is sealed by a packing assembly 124.

Piston 112 has a skirt 126 sealed by packing assembly 127 and having an internal bead 130 providing with a bevelled shoulder 131. Fingers 122 have external bead portions 132 with bevelled faces 133, 128. A split circular spring 129 urges the free ends of fingers 122 radially inward. Inward deflection of the free ends of the fingers is limited either by tapered surface 166 or by circumferential contact of the free ends of the fingers.

Slidably mounted on piston rod 113 is a tubular locking plunger 134 having a locking flange 135 with a bevelled edge 136 and moveable toward a stop flange 144 on rod 113 by a spring 141 that bears against flange 143 and the inner wall 142 of piston 112. Locking plunger 134 is sealed at one diameter against rod 113 by packing 137 and against a cylindrical boss 148 of piston 112 on a larger diameter. The space 162 between packings 137, 138 is communicated to the right side of piston 112 by slots 146 and 155, tabs 151 and 154 being a loose fit in these slots to permit such communication.

The difference in these diameters provides a differential area on the external end surface of plunger 134 such that fluid pressure within piston skirt 126 acting on plunger 134 urges the latter toward the right in opposition to spring 141.

At its other end cylinder 111 is closed by an end cap 160 having a port 161 leading to the interior of the cylinder on the right side of piston 112.

OPERATION OF FIGURE 6 FORM

Actuator 110 may likewise be used with the fluid supply means 90 shown in FIGURE 5 with port 161 connected to line 110 and port 115 connected to line 103.

To extend rod 113 from the fully retracted position in which piston 112 is bottomed against end cap 160, valve 93 is moved to position 94 to deliver pressure fluid to the right side of piston 112 via port 161 and to exhaust fluid from the left side of the piston via port 115. This causes piston 112 to move to the left. Some of the pressure fluid also enters space 162 via slots 155 and 146 to act on plunger shoulder 145 to augment the pressure of spring 141 in maintaining plunger flange 135 against rod flange 144. At this time spring 129 has deflected the free ends of fingers 128 radially inward by rocking the fingers about their support portions 121 in the same manner described in connection with FIGURE 3.

As piston bead 130 approaches fingers 122 it passes over finger beads 132 and corner 165 of the latter engages cam surface 136 to hold plunger 134 stationary until bead 130 has passed beyond bead 132. Surface 136 then cams the free ends of the fingers upwardly and spring 141 moves flange 135 within the fingers to lock them in the radial position shown in FIGURE 7, as piston 112 continues to move to fully extended position.

To retract rod 113 valve 93 is moved to position 95 to apply pressure fluid to the left side of piston 112 and to exhaust fluid from the right side for moving piston 112 toward the left. Pressure fluid on the left side of the piston acts on the external differential area of plunger 134 defined by packings 137, 138 to move flange 135 away from flange 144. This permits spring 129 and bevel faces 131, 133 to deflect the free ends of fingers 122 radially inward after flange 135 has moved out of the fingers and bead 130 then passes over bead 132 to permit full retraction of rod 113.

To lock the rod against full retraction, valve 93 is moved to position 96 before piston 112 has retracted to the position shown in FIGURE 6. This equalizes pressure on the two sides of piston 112, permitting spring 141 to move lock flange 135 against flange 144 so that lock flange 135 remains inside fingers 122 to prevent their inward deflection. This maintains bead 132 in the path of bead 130 to prevent further retraction of rod 113 by external force.

Reapplication of fluid pressure to the left side of piston 112 moves lock plunger 134 to the right to withdraw lock flange 135 from within the fingers 122 to release the engagement of beads 130 and 132 to permit completion of retraction movement.

I claim:

1. A fluid pressure operated actuator comprising a cylinder containing a movable piston, means for latching said piston means against movement in one direction, said latching means comprising a piston carried latching member and a plurality of movable cylinder mounted latching fingers, and piston carried locking means for moving said fingers into latching position for engagement by said latching member.

2. A fluid pressure operated actuator according to claim 1 wherein said latching member is closer to the inner surface of the cylinder than said fingers and said piston carried locking means comprises a camming surface positioned to cam said fingers outwardly and into latching position upon engagement with said fingers.

3. An actuator according to claim 1 wherein said locking means includes means responsive to a predetermined difference in fluid pressures between opposite sides of said piston for releasing said fingers from latched engagement with said latching member.

4. An actuator according to claim 1 wherein said latching member comprises an inwardly projecting shoulder on said piston, said fingers having outwardly projecting shoulders and said locking means is engageable with said fingers to move the outwardly projecting shoulders into the path of the inwardly projecting shoulders.

5. An actuator according to claim 4 wherein said fingers are arranged in a generally cylindrical array, and there is a spring means radially inwardly biasing said fingers for forcing said fingers inwardly out of latching relationship with said inwardly projecting shoulder when said locking means is disengaged from said fingers.

6. An actuator according to claim 3 wherein said means responsive to a predetermined pressure difference includes a bore provided by said piston, and plunger received in said bore and having an end portion extending outwardly thereof, said plunger having camming means mounted on said end portion for camming engagement with said fingers, said bore being in fluid communication with said cylinder on both sides of said piston for admitting fluid into pressure exerting relation with respective sides of said plunger for movement of said plunger and camming means with respect to said piston.

7. An actuator according to claim 6 wherein said piston comprises a piston rod and a piston head thereon, said bore being formed in said piston rod.

8. An actuator according to claim 6 wherein said means responsive to a predetermined pressure further includes a spring within said bore in biasing engagement with said plunger for maintaining said plunger against movement relative to said piston when said piston is latched against movement in one direction in absence of a predetermined pressure difference.

9. A fluid pressure operated actuator according to claim 3 wherein said piston includes a piston rod connected to a piston head, said means responsive to a predetermined pressure difference includes a plunger having a bore therethrough and mounted upon said piston rod on one side of said piston head for limited movement relative thereto and having an outwardly extending camming means thereon for camming engagement with said fingers.

10. An actuator according to claim 9 in which there is a shoulder formed within said bore, and fluid passage means communicating said shoulder and the portion of said cylinder on the other side of said piston for admitting fluid into contact with said shoulder.

11. An actuator in accordance with claim 1 in which said locking means includes a plunger slidably carried by the piston, the plunger being spring pressed toward first position in which said locking means maintains the fingers in latching position, and said plunger being responsive to fluid pressure on one side of the piston to move the plunger to second position in which said locking means releases the fingers from said latching position.

12. The actuator of claim 11 in which said plunger is subject to fluid pressure on the other side of the piston to augment the spring pressure for urging the plunger toward said first position.

13. The actuator of claim 1 in which said piston has a rod with portions of two diameters, said locking means includes a hollow plunger slidably mounted on the rod and sealed relatively thereto at each of said diameters to form an effective pressure area on the exterior side of said plunger, means for directing fluid under pressure on one side of said piston to said area for moving said plunger, and a passage connecting the interior of the plunger between said seals to the other side of the piston.

14. An actuator according to claim 1 wherein said piston is movable between first and second terminal positions within said cylinder and said latching means is adapted to latch said piston against movement in one direction at a point intermediate said first and second terminal positions.

15. An actuator according to claim 14 wherein said latching means are adapted to prevent movement of said piston in one direction only.

16. A fluid pressure operated actuator comprising a cylinder, a piston movable within said cylinder between first and second terminal positions, latching means for latching said piston from movement in one direction toward one of said terminal positions at a point intermediate said first and second terminal positions, and locking means responsive to fluid pressure conditions on opposite sides of said piston for locking and releasing said latching means, said latching means comprising at least one member pivotally connected with said cylinder for pivoting into and out of latching cooperation with said piston and means carried by said piston for pivoting said at least one member.

17. A fluid pressure operated actuator comprising a cylinder, a piston movable within said cylinder between first and second terminal positions, latching means for latching said piston for movement in one direction toward one of said terminal positions at a point intermediate said first and second terminal positions, and locking means responsive to fluid pressure conditions on opposite sides of said piston for locking and releasing said latching means, said latching means comprising a plurality of elongate latching fingers extending substantially parallel to the inner cylinder wall, and a skirt on the piston positioned to be in telescopic relationship to said fingers when said piston is at said point.

18. An actuator according to claim 17 wherein said fingers are disposed in a generally cylindrical configuration and said skirt is positioned to extend between said fingers and the inner cylinder wall.

19. An actuator according to claim 18 wherein one end of each finger is pivotally mounted in said cylinder, said locking means including camming means for camming the other end of said fingers outwardly toward the cylinder wall.

20. A fluid pressure operated actuator according to claim 19 wherein there is a stop means for limiting the pivoting movement of said fingers.

21. A fluid pressure operated actuator according to claim 19 wherein said latching means further comprises spring means surrounding said fingers for biasing said fingers inwardly away from the cylinder wall.

22. An actuator according to claim 16 wherein said locking means includes a bore in said piston, a plunger in said bore, said bore being in fluid communication with said cylinder on both sides of said piston for admitting fluid into pressure exerting relation with respective sides of said plunger for movement of said plunger.

23. An actuator according to claim 17 wherein said locking means includes a bore provided by said piston, a plunger received in said bore and having an end portion extending outwardly thereof, camming means mounted on said end portion for camming engagement with said fingers, said bore being in fluid communication with said cylinder on both sides of said piston for admitting fluid into force exerting relation with respective sides of said plunger for movement of said piston and camming means with respect to said piston.

24. An actuator according to claim 17 wherein said piston comprises a piston head and a piston rod, said locking means comprising a plunger having a bore therethrough and mounted upon said piston rod for limited movement relative thereto, said plunger having an outwardly extending cam means thereon for camming engagement with said fingers and a shoulder formed within said bore, and fluid passage means communicating said shoulder and the portion of said cylinder on the other side of the piston head for admitting fluid into contact with said shoulder.

25. A fluid pressure operated actuator comprising a cylinder, a piston movable within said cylinder between first and second terminal positions, latching means for latching said piston against movement in one direction intermediate said first and second terminal positions, locking means responsive to predetermined fluid pressure conditions in said cylinder on opposite sides of said piston for maintaining said latching means in latched condition, and fluid supply means for selectively supplying fluid to said cylinder to move said piston in one direction, for selectively supplying fluid to said cylinder to move said piston in the opposite direction, and for selectively providing said predetermined fluid pressure conditions in said cylinder on opposite sides of said piston to maintain said latching means in latched condition, said latching means comprising at least one member pivotally connected with said cylinder for pivoting into and out of latching cooperation with said piston, and said locking means comprising means carried by said piston for pivoting said at least one member.

26. An actuator according to claim 25 further comprising first and second ports in said cylinder, said fluid supply means comprising fluid pumping means, and valve means for selective operation in three conditions, said valve means being operative to interconnect said fluid pumping means and said first port when in the first of said conditions, operative to interconnect said pumping means and said second port in the second of said conditions, and operative to maintain said pumping means out of fluid communication with said first and second ports in the third of said conditions.

27. A fluid pressure operated actuator comprising a cylinder, a piston movable within said cylinder between first and second terminal positions, latching means for latching said piston against movement in one direction intermediate said first and second terminal positions, locking means responsive to predetermined fluid pressure conditions in said cylinder on opposite sides of said piston for maintaining said latching means in latched condition, and fluid supply means for selectively supplying fluid to said cylinder to move said piston in one direction, for selectively supplying fluid to said cylinder to move said piston in the opposite direction, and for selectively providing said predetermined fluid pressure conditions in said cylinder on opposite sides of said piston to maintain said latching means in latched condition, said cylinder having first and second ports therein, said fluid supply means comprising fluid pumping means, a fluid reservoir, and valve means for selective operation in three conditions, said valve means being operative to interconnect said fluid pumping means and said first port when in the first of said conditions, and being adapted to operatively place said reservoir in fluid communication with said second port when in said first condition, being operative to interconnect said pumping means and said second port in the second of said conditions and to operatively place said reservoir in fluid communication with said first port when in said second condition, and being operative to maintain said pumping means out of fluid communication with said first and second ports in the third of said conditions and to operatively place said reservoir in fluid communication with said first and second ports when in said third condition.

28. A fluid pressure operated actuator comprising a cylinder, a piston disposed within said cylinder and adapted for movement therein in first and second directions, a plurality of ports opening into said cylinder for admitting fluid thereto and emitting fluid therefrom, header means for directing fluid to said plurality of ports, said header means comprising an outer member having a bore formed therein, a core member situated within said bore and having a plurality of passages formed therein, said core member being in contact with the inner surface of said bore at a plurality of spaced points to form between said points a plurality of fluid chambers, said plurality of fluid passages opening into said chambers, said outer member having formed therein a plurality of fluid openings in fluid communication with said chambers and means placing said plurality of fluid openings in said outer means in fluid communication with said plurality of ports opening into said cylinder.

29. An actuator according to claim 28 wherein said header means is disposed upon said cylinder, said outer member having at least one generally cylindrical outer surface portion thereon adapted to provide bearing support to said actuator.

30. An actuator according to claim 29 wherein said core member further comprises at least one portion thereof disposed radially inwardly from said at least one generally cylindrical surface portion of said outer member, at least one of said fluid passages formed in said core member opening through said portion of said core member.

31. An actuator according to claim 28 wherein said header means is disposed upon said cylinder at one end thereof, said bore and cylinder being disposed along generally perpendicular axes, one of said ports opening into said cylinder being disposed at the end of said cylinder away from said header, said means placing said plurality of fluid openings in said outer member in fluid communication with said plurality of ports comprising at least one longitudinally disposed fluid duct interconnecting said one port and one of said openings.

References Cited

UNITED STATES PATENTS

| | | | |
|---|---|---|---|
| 2,708,909 | 5/1955 | Curlett | 137—625.68 |
| 2,790,426 | 4/1957 | Mueller | 92—119 |
| 3,251,278 | 5/1966 | Royster | 92—24 XR |

CARLTON R. CROYLE, *Primary Examiner.*

A. D. HERRMANN, *Assistant Examiner.*

U.S. Cl. X.R.

92—26, 119